US012639944B2

(12) United States Patent
Burch, V et al.

(10) Patent No.: US 12,639,944 B2

(45) Date of Patent: May 26, 2026

(54) MOBILE MARKERLESS MOTION CAPTURE FOR MOVEMENT DATA COLLECTION IN ALL ENVIRONMENTS

(71) Applicant: Mississippi State University, Mississippi State, MS (US)

(72) Inventors: Reuben F. Burch, V, Starkville, MS (US); David N. Saucier, Starkville, MS (US); John Carver Middleton, Starkville, MS (US); Harish Chander, Starkville, MS (US); Timothy C. Teer, Starkville, MS (US); Mohamed El Mehdi Ouhabi, Starkville, MS (US); Christopher White, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 0 days.

(21) Appl. No.: 18/793,604

(22) Filed: Aug. 2, 2024

(65) Prior Publication Data

US 2025/0046077 A1 Feb. 6, 2025

Related U.S. Application Data

(60) Provisional application No. 63/530,425, filed on Aug. 2, 2023.

(51) Int. Cl.
| | |
|---|---|
| *G06V 20/17* | (2022.01) |
| *B64C 39/02* | (2023.01) |
| *H04N 21/234* | (2011.01) |

(52) U.S. Cl.
CPC ............ *G06V 20/17* (2022.01); *B64C 39/024* (2013.01); *H04N 21/23424* (2013.01)

(58) Field of Classification Search
CPC .................. G06V 20/17; B64C 39/024; H04N 21/23424; B64U 2101/30
See application file for complete search history.

(56) References Cited

U.S. PATENT DOCUMENTS

| | | | |
|---|---|---|---|
| 10,013,763 B1 * | 7/2018 | Brailovskiy | ......... H04N 23/698 |
| 12,087,051 B1 * | 9/2024 | Lecocke | ................ G06V 20/10 |

(Continued)

FOREIGN PATENT DOCUMENTS

| | | |
|---|---|---|
| EP | 3614341 A1 | 2/2020 |

OTHER PUBLICATIONS

Kiciroglu, et al., "ActiveMoCap: Optimized Viewpoint Selection for Active Human Motion Capture," Computer Vision and Pattern Recognition, 2020, pp. 103-112.

(Continued)

*Primary Examiner* — Michael E Teitelbaum

(74) *Attorney, Agent, or Firm* — Conley Rose, P.C.

(57) ABSTRACT

A method comprises: instructing a leader drone in a drone swarm to move to a first position; instructing a first follower drone in the drone swarm to move to a second position; instructing a first camera of the leader drone to record, while the leader drone is in the first position, a first video of an object; instructing a second camera of the first follower drone to record, while the first follower drone is in the second position, a second video of the object; wirelessly receiving the first video from the leader drone; wirelessly receiving the second video from the first follower drone; stitching together the first video and the second video to obtain a master video; and performing motion capture on the master video to obtain motion data of the object.

20 Claims, 4 Drawing Sheets

(56) References Cited

U.S. PATENT DOCUMENTS

| | | | |
|---|---|---|---|
| 2022/0108468 A1* | 4/2022 | Nakamura | G06T 7/73 |
| 2023/0008482 A1* | 1/2023 | Yang | G05D 1/028 |
| 2023/0343088 A1* | 10/2023 | Kim | G06V 20/17 |
| 2025/0223036 A1* | 7/2025 | Venkatesh | B64C 39/024 |

OTHER PUBLICATIONS

Xu, et al., "FlyCap: Markerless Motion Capture Using Multiple Autonomous Flying Cameras," IEEE Transactions on Visualization and Computer Graphics, vol. 24, No. 8, Aug. 2018, pp. 2284-2297.
Zhou, et al., "Human Motion Capture Using a Drone," 2018 IEEE International Conference on Robotics and Automation (ICRA) May 21-25, 2018, Brisbane, Australia, pp. 2027-2033.

* cited by examiner

100

Drone₁
120

Drone 2
120 o o o

Droneₙ
120

ANIMAL
110

130
COMPUTER

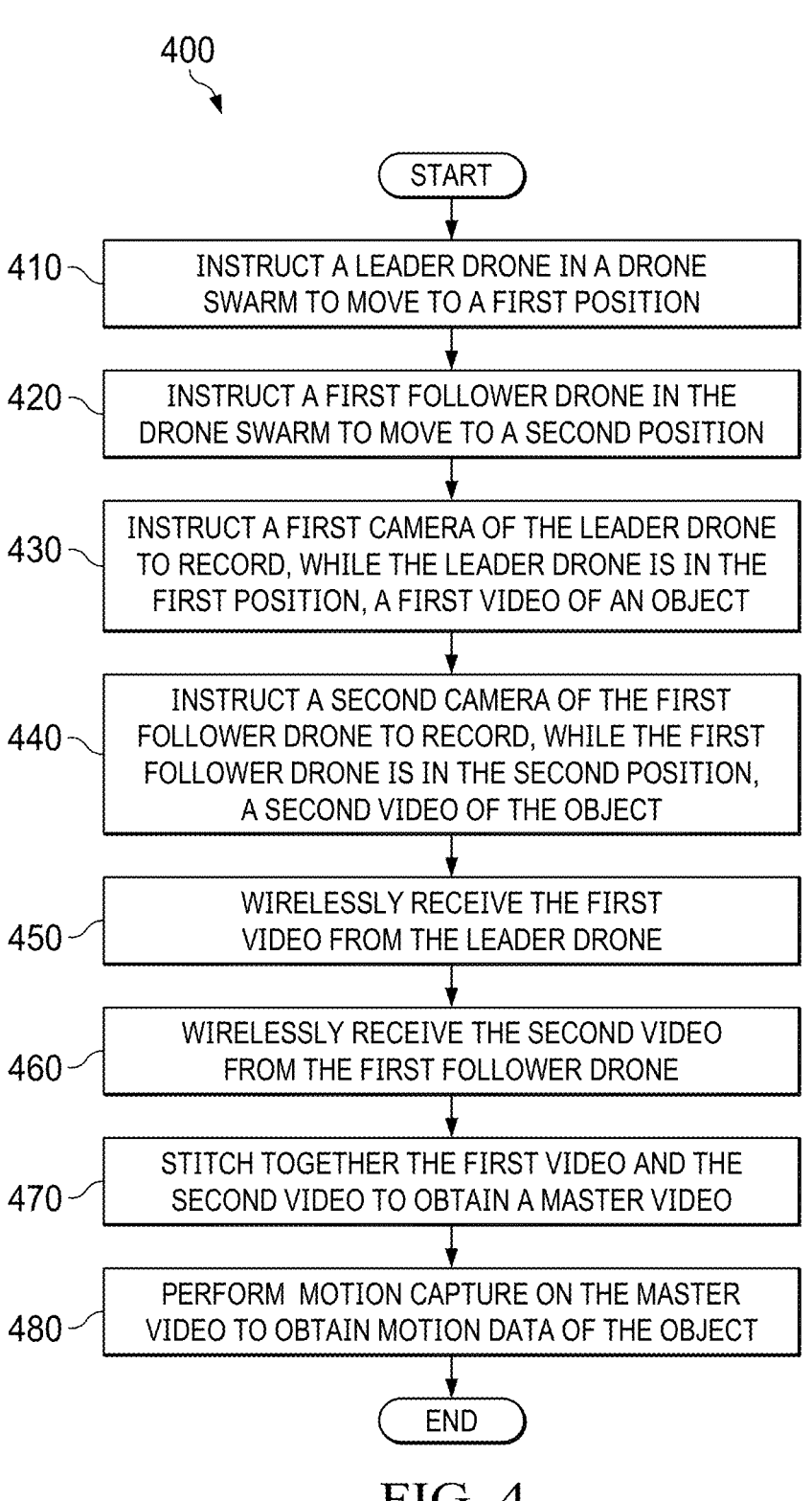

400

START

410 — INSTRUCT A LEADER DRONE IN A DRONE SWARM TO MOVE TO A FIRST POSITION

420 — INSTRUCT A FIRST FOLLOWER DRONE IN THE DRONE SWARM TO MOVE TO A SECOND POSITION

430 — INSTRUCT A FIRST CAMERA OF THE LEADER DRONE TO RECORD, WHILE THE LEADER DRONE IS IN THE FIRST POSITION, A FIRST VIDEO OF AN OBJECT

440 — INSTRUCT A SECOND CAMERA OF THE FIRST FOLLOWER DRONE TO RECORD, WHILE THE FIRST FOLLOWER DRONE IS IN THE SECOND POSITION, A SECOND VIDEO OF THE OBJECT

450 — WIRELESSLY RECEIVE THE FIRST VIDEO FROM THE LEADER DRONE

460 — WIRELESSLY RECEIVE THE SECOND VIDEO FROM THE FIRST FOLLOWER DRONE

470 — STITCH TOGETHER THE FIRST VIDEO AND THE SECOND VIDEO TO OBTAIN A MASTER VIDEO

480 — PERFORM MOTION CAPTURE ON THE MASTER VIDEO TO OBTAIN MOTION DATA OF THE OBJECT

END

FIG. 4

MOBILE MARKERLESS MOTION CAPTURE FOR MOVEMENT DATA COLLECTION IN ALL ENVIRONMENTS

CROSS-REFERENCE TO RELATED APPLICATIONS

This claims priority to U.S. Prov. Patent App. No. 63/530,425 filed on Aug. 2, 2023, which is incorporated by reference.

STATEMENT REGARDING FEDERALLY SPONSORED RESEARCH OR DEVELOPMENT

Not applicable.

TECHNICAL FIELD

This disclosure relates to motion capture in general and mobile markerless motion capture in particular.

BACKGROUND

Motion capture, which may also be referred to as motion tracking, mo-cap, or mocap, is the process of recording the motion of objects, including animals or humans. The motion is defined as the object changing from a first position to a second position. Motion capture has applications in entertainment, sports, medicine, robotics, and the military. Unlike video recording, motion capture does not capture the full appearances of objects. However, motion capture enables better capture and prediction of physical interactions.

SUMMARY

In one embodiment, a method comprises: instructing a leader drone in a drone swarm to move to a first position; instructing a first follower drone in the drone swarm to move to a second position; instructing a first camera of the leader drone to record, while the leader drone is in the first position, a first video of an object; instructing a second camera of the first follower drone to record, while the first follower drone is in the second position, a second video of the object; wirelessly receiving the first video from the leader drone; wirelessly receiving the second video from the first follower drone; stitching together the first video and the second video to obtain a master video; and performing motion capture on the master video to obtain motion data of the object.

In another embodiment, an apparatus comprises: one or more memories configured to store instructions; and one or more processors coupled to the one or more memories and configured to execute the instructions to cause the apparatus to: instruct a leader drone in a drone swarm to move to a first position; instruct a first follower drone in the drone swarm to move to a second position; instruct a first camera of the leader drone to record, while the leader drone is in the first position, a first video of an object; instruct a second camera of the first follower drone to record, while the first follower drone is in the second position, a second video of the object; wirelessly receive the first video from the leader drone; wirelessly receive the second video from the first follower drone; stitch together the first video and the second video to obtain a master video; and perform motion capture on the master video to obtain motion data of the object.

In yet another embodiment, a computer program product comprises instructions that are stored on a computer-readable medium and that, when executed by a processor, cause an apparatus to: instruct a leader drone in a drone swarm to move to a first position; instruct a first follower drone in the drone swarm to move to a second position; instruct a first camera of the leader drone to record, while the leader drone is in the first position, a first video of an object; instruct a second camera of the first follower drone to record, while the first follower drone is in the second position, a second video of the object; wirelessly receive the first video from the leader drone; wirelessly receive the second video from the first follower drone; stitch together the first video and the second video to obtain a master video; and perform motion capture on the master video to obtain motion data of the object.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a flowchart of a method of mobile markerless motion capture.

DETAILED DESCRIPTION

Figure 1:
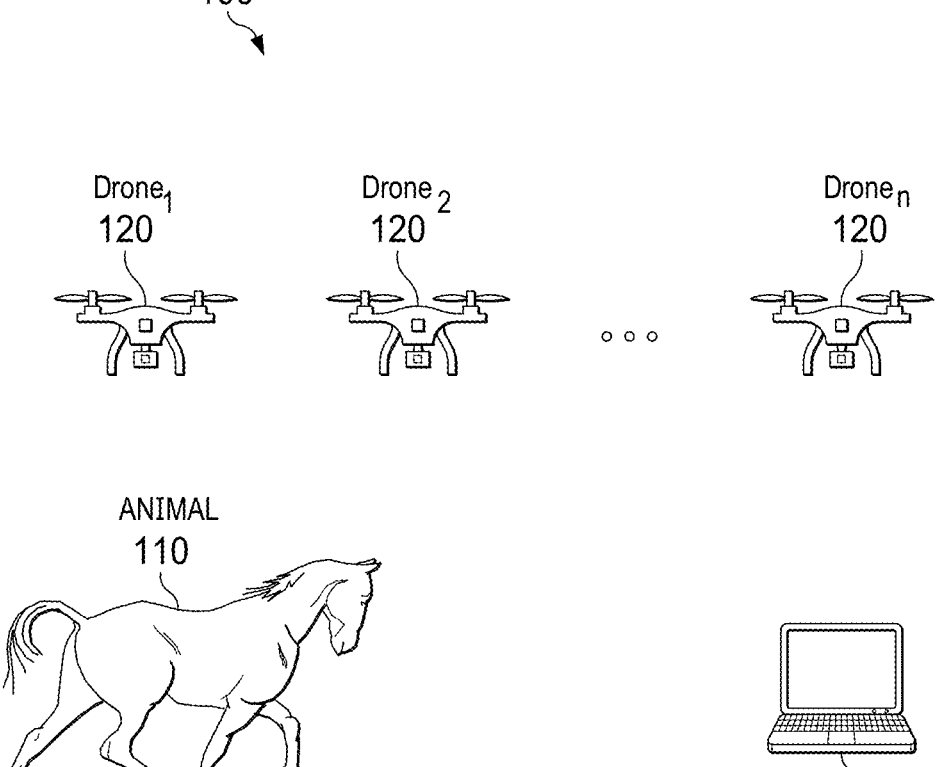
FIG. 1 is a schematic diagram of a system according to an embodiment.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:

AI: artificial intelligence
ASIC: application-specific integrated circuit
CPU: central processing unit
DSP: digital signal processor
ENABLE: Engine for Automatic Biomechanical Evaluation
EO: electrical-to-optical
FPGA: field-programmable gate array
GPS: Global Positioning System
MMM: mobile markerless motion
OE: optical-to-electrical
RAM: random-access memory
RF: radio frequency
ROM: read-only memory
RX: receiver unit
SRAM: static RAM
SwRI: Southwest Research Institute
TCAM: ternary content-addressable memory
TX: transmitter unit
UAS: unmanned aircraft system 2D: two-dimensional 3D: three-dimensional.

One type of motion capture is markered motion capture, which uses markers placed on an object to identify points of interest of the object. The markered motion capture tracks those points of interest over a period of time in order to imitate or predict motion of the object. The markers may be reflectors, and the points of interest include joints or other areas that experience significant motion. Markered motion capture is considered the gold standard of biomechanical data collection for assessment. However, placing the markers on an object before it performs motion is both time-consuming and inconsistent depending on the placement, attachment, and occlusion of the markers. Marker systems are also expensive and do not perform well outside of a controlled environment such as a research lab.

Another type of motion capture is markerless motion capture. As the name indicates, markerless motion capture does not use markers. Instead, motion is captured from video recordings using high-resolution cameras with high refresh rates. The cameras are placed around the object and on top of stands to record multiple angles of motion. Software that is trained to recognize points of interest runs a post-processing analysis to generate a full biomechanical report of motion. Setup for the system may require only a fiducial marker placed centrally in view of the cameras. If the cameras stay in the same configuration and orientation with respect to each other, then no additional setup is needed. The system becomes more accurate with an increase in the number of cameras. Due to advancements, including neural network training, the accuracy of markerless motion capture is approaching and may exceed markered motion capture. However, such markerless motion capture is restricted to a laboratory environment due to the camera stand and other necessary equipment.

Disclosed herein are embodiments for mobile markerless motion capture for movement data collection in all environments. Instead of stationary cameras on camera stands, the embodiments use UASs, or drones, to capture video and transmit the video to a computer for motion capture. The disclosed embodiments avoid the time consumption, inconsistency, and cost of markered motion capture, yet also enable motion capture beyond the laboratory environment, for instance, on a sports field or in a military training facility, pasture, or outdoor testing facility. The data can be collected wherever an object moves like with wearable devices, but without the need to place a wearable device on the object.

The disclosed embodiments have the following uses: medical and rehabilitation environments for pre-recovery and post-recovery, diagnosis, and prognosis; industrial use cases where analyzing the task is difficult due to the environment or nature of the task; employees performing challenging, hard-to-capture tasks in hard-to-capture environments, including anywhere movement data need to be captured where the object will be moving too much for a stationary motion capture solution; military institutions to capture the solider in his or her natural environment to assess rucksack load impact; and sports teams for analyzing baseball pitching, softball pitching, football throwing, tennis hitting, running, or another form. Other approaches do not address the following: actual animal performance such as speed, jump height, acceleration, deceleration; specifics as to joint and limb segment identification leading to the lack of identification of what is moving, what movement is being performed, and in what plane or multiplane; joint rotation and full biomechanical assessment; analysis of combinations of joints and limb segments like gait or other complete tasks; foot pressure and ground reaction forces; detection of gait abnormalities and other physically identifiable medical symptoms; volumetric information like surface area, swelling, and general size differences between participants, including all size measurements of all parts of the object as well as inferred weight; synchronizing of the cameras; synchronizing of drones positioning about the ground, object, and other drones using a fiducial marker or some other identifier during the configuration stage prior to data collection; being ruggedized and hardened against the environment and changes in the environment such as precipitation, pressure, amount of light, and temperature.

FIG. 1 is a schematic diagram of a system 100 according to an embodiment. The system 100 comprises an animal 110, drones 120, and a computer 130. The system 100 implements mobile markerless motion capture.

While the animal 110 is shown, the animal 110 may be a human or another object of interest. The animal 110 does not have markers attached to it. The animal 110 performs motion that is to be captures and assessed.

The drones 120 comprise n drones 120 that form a drone swarm, where n is greater than 2. Alternatively, the system 100 comprises only one drone 120 or two drones 120. However, the mobile markerless motion capture may improve with each additional drone 120.

While the computer 130 is shown as a laptop computer, the computer 130 may be a desktop computer or another suitable computing device. Alternatively, the computer 130 is a cloud-based system or shares tasks with the cloud-based system.

Figure 2:
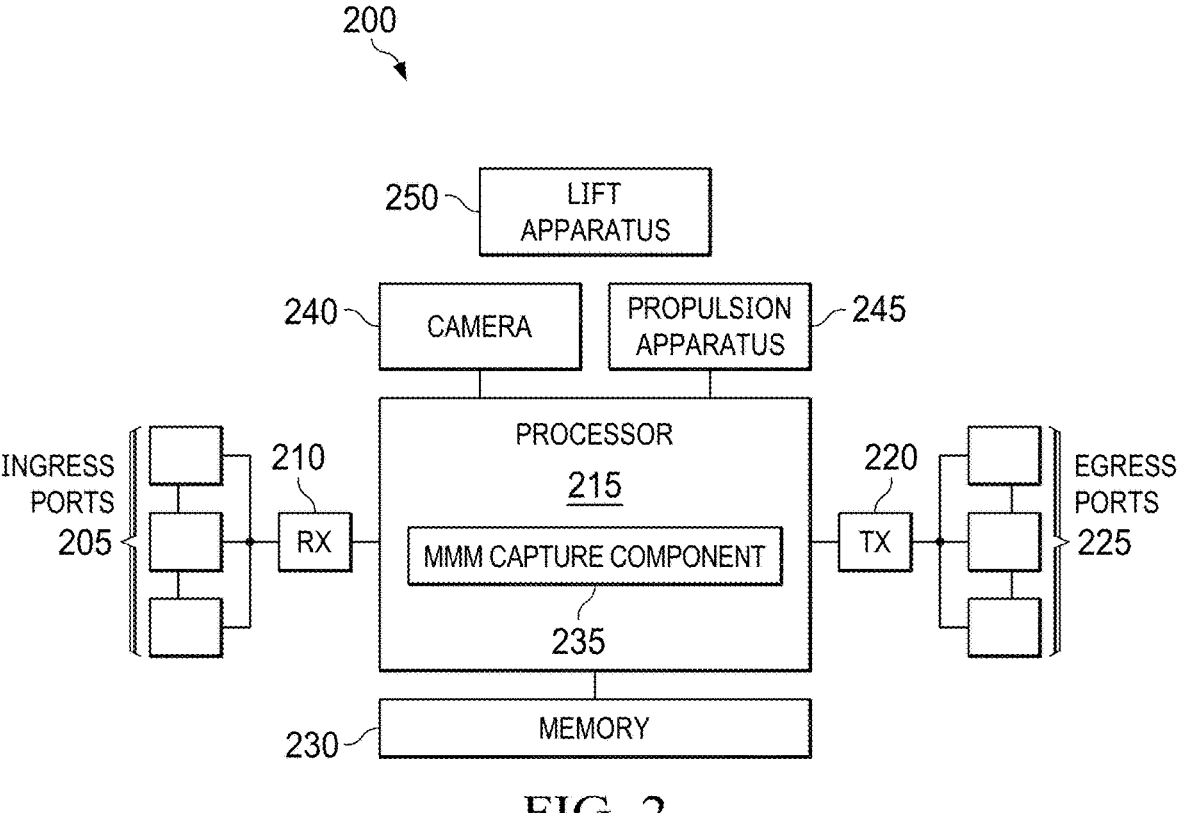
FIG. 2 is a schematic diagram of an apparatus.

FIG. 2 is a schematic diagram of an apparatus 200. The apparatus 200 may implement the disclosed embodiments, for instance, the drones 120 and the computer 130. The apparatus 200 comprises ingress ports 205 and an RX 210 to receive data; a processor 215, or logic unit, baseband unit, or CPU, to process the data; a TX 220 and egress ports 225 to transmit the data; and a memory 230 to store the data. The apparatus 200 further comprises a camera 240, a propulsion apparatus 245, and a lift apparatus 250, which may be present in the drones 120, but may not be present in the computer 130. The apparatus 200 may further comprise OE components, EO components, or RF components coupled to the ingress ports 205, the RX 210, the TX 220, and the egress ports 225 to provide ingress or egress of optical signals, electrical signals, or RF signals.

The processor 215 is any combination of hardware, middleware, firmware, or software. The processor 215 comprises any combination of one or more CPU chips, cores, FPGAs, ASICS, or DSPs. The processor 215 communicates with the ingress ports 205, the RX 210, the TX 220, the egress ports 225, and the memory 230. The processor 215 comprises an MMM capture component 235, which implements the disclosed embodiments. The inclusion of the MMM capture component 235 therefore provides a substantial improvement to the functionality of the apparatus 200 and effects a transformation of the apparatus 200 to a different state. Alternatively, the memory 230 stores the MMM capture component 235 as instructions, and the processor 215 executes those instructions.

The memory 230 comprises any combination of disks, tape drives, or solid-state drives. The apparatus 200 may use the memory 230 as an overflow data storage device to store programs when the apparatus 200 selects those programs for execution and to store instructions and data that the apparatus 200 reads during execution of those programs. The memory 230 may be volatile or non-volatile and may be any combination of ROM, RAM, TCAM, or SRAM.

A computer program product may comprise computer-executable instructions that are stored on a computer-readable medium and that, when executed by a processor, cause an apparatus to perform any of the embodiments. The computer-readable medium may be non-transitory. The computer-readable medium may be the memory 230, the processor may be the processor 215, and the apparatus may be the apparatus 200.

The camera 240 is a high-resolution camera that obtains video suitable for performing markerless motion capture. "High-resolution" may mean a resolution of 5K or better. Alternatively, the resolution is adjustable. The video may be in full color or any subset of colors.

The propulsion apparatus 245 comprises a motor, a motor controller, and a propulsion component. The motor controller controls the motor to run at a desired output to drive the propulsion component. The propulsion component comprises one or more fan or propeller configured to propel the apparatus 200 in any direction.

The lift apparatus 250 comprises at least one wing or other structure configured to provide lift. The propulsion apparatus 245 and the lift apparatus 250 may be the same.

Figure 3:
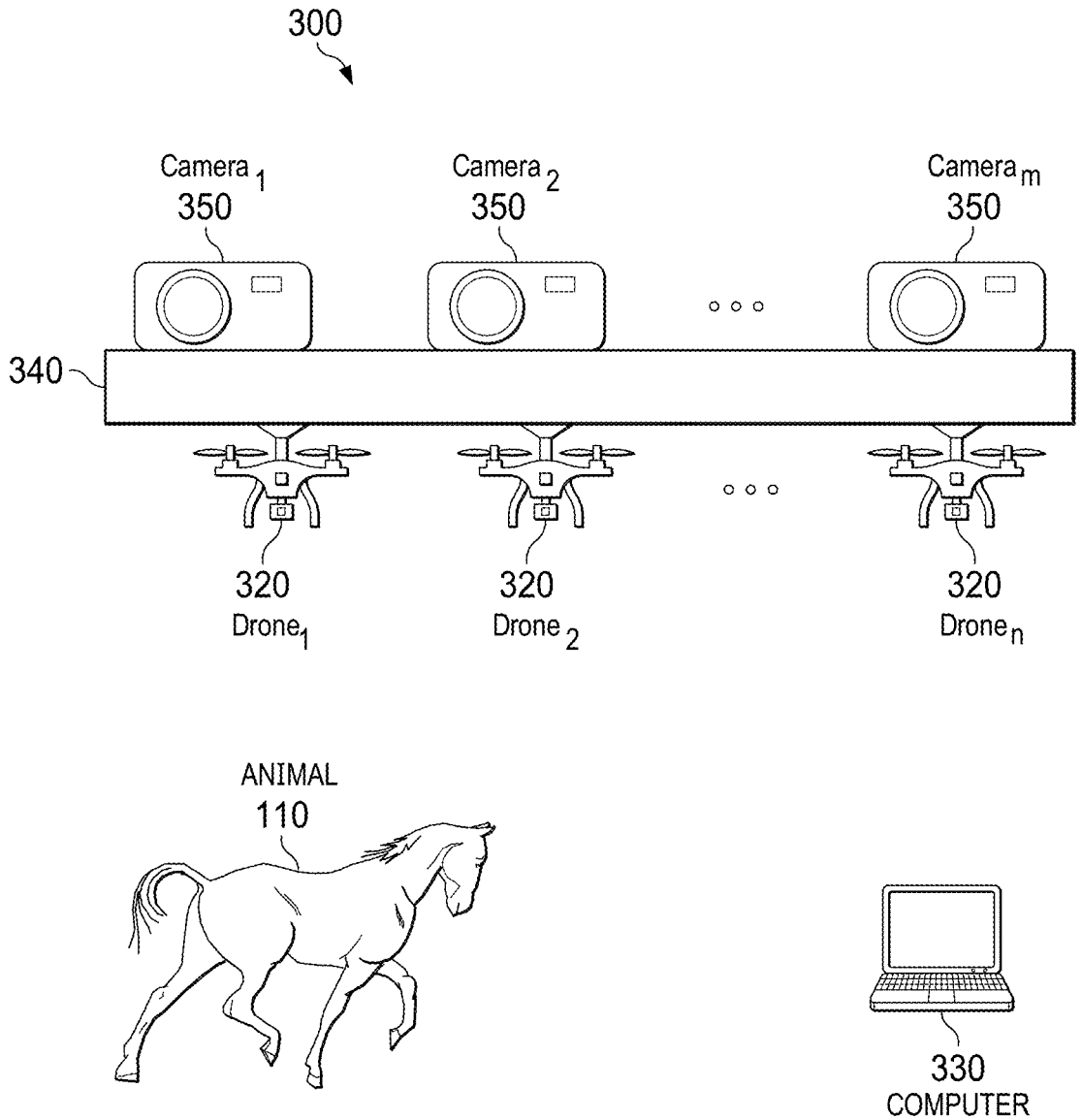
FIG. 3 is a schematic diagram of a system according to another embodiment.

FIG. 3 is a schematic diagram of a system 300 according to another embodiment. The system 300 is similar to the system 100 in FIG. 1. Specifically, the system 300 comprises an animal 310, drones 320, and a computer 330, which are similar to the animal 110, the drones 120, and the computer 130. However, unlike the system 100, the system 300 further comprises a support frame 340 and cameras 350.

The support frame 340 is made of carbon, aluminum, or another light and strong material. The support frame 340 attaches the drones 320 and the cameras 350. The support frame 340 may be modular to more easily enable addition or subtraction of drones 320 or cameras 350. The support frame 340 ensures that the drones 320 and the cameras 350 maintain static positional relationships with respect to each other.

The cameras 350 are similar to the camera 240 in FIG. 2. The cameras 350 comprise m cameras 350, where m is greater than 2 and may be the same as n. Alternatively, the system 300 comprises only one camera 350 or two cameras 350. However, the mobile markerless motion capture may improve with each additional camera 350.

FIG. 4 is a flowchart of a method 400 of mobile markerless motion capture. The system 100 may implement the method 400. Specifically, the computer 130 may implement the method 400.

At step 410, a leader drone in a drone swarm is instructed to move to a first position. The leader drone may be the drone₁ 120. The first position may be relative to an object, which may be the animal 110. For instance, the drone₁ 120 uses the camera 240 to locate the object, then the drone₁ 120 positions itself relative to the object. The first position may be relative to the object based on a distance, an angle, a set of coordinates in a 2D coordinate system or a 3D coordinate system, or GPS or other global coordinates, all between the drone₁ 120 and the animal.

At step 420, a first follower drone in the drone swarm is instructed to move to a second position. The first follower drone may be the drone₂ 120. The second position may be relative to the leader drone. For instance, the drone₂ 120 uses the camera 240 to locate the drone₁ 120, then the drone₂ 120 positions itself relative to the drone₁ 120 using the MMM capture component 235, which may comprise proximity awareness software. Alternatively, the drone₂ 120 communicates with the drone 120 to locate the drone₁ 120. The second position may be relative to the leader drone based on a distance, an angle, a set of coordinates in a 2D coordinate system or a 3D coordinate system, or GPS coordinates, all between the drone₂ 120 and the drone₁ 120. Alternatively, the leader drone does not lead and the first follower drone does not follow, but instead they both independently move to positions relative to the object.

At step 430, a first camera of the leader drone is instructed to record, while the leader drone is in the first position, a first video of an object. The first camera may be the camera 240. The leader drone may be instructed to record the first video beginning at a first moment.

At step 440, a second camera of the first follower drone is instructed to record, while the first follower drone is in the second position, a second video of the object. The second camera may be the camera 240. The first follower drone may be instructed to record the second video beginning at the first moment.

The first camera and the second camera may be instructed to synchronize with each other before the first moment to ensure that the first camera and the second camera define moments as the same objective time. The first camera may embed in the first video first timestamps of each moment. The second camera may embed in the second video second timestamps of each moment.

The leader drone and the first follower drone may be instructed to synchronize with each other while the first camera records the first video and the second camera records the second video to ensure that the leader drone and the first follower drone define positional data based on the same objective coordinates and to ensure that the leader drone and the first follower drone remain in a desired formation in relation to the object and each other. The leader drone may embed in the first video first positional data associated with each of the first timestamps. The first follower drone may embed in the second video second positional data associated with each of the second timestamps. The first positional data comprise coordinates in a 2D coordinate system or a 3D coordinate system or comprise GPS or other global coordinates. The second positional data comprise the same coordinates or comprise coordinates relative to the leader drone. The leader drone and the first follower drone may subsequently resynchronize in response to an event such as a loss of power or an instruction from the computer 130.

The leader drone may be instructed to maintain the first position while the object moves and for a duration of the first video and the second video. Likewise, the first follower drone may be instructed to maintain the second position while the object moves and for the duration. Alternatively, the leader drone may be instructed to move from the first position while the object moves and based on a change of a surface the object is on, environmental conditions, or a first video quality of the first video. Likewise, the first follower drone may be instructed to move from the second position while the object moves and based on the change, the environmental conditions, or a second video quality of the second video.

The first camera and the second camera may adjust their resolution based on a distance from the object, a number of cameras recording videos of the object, or another criterion. Alternatively, the first camera or the second camera may adjust its distance from the object based on its resolution or the number of cameras recording video of the object.

At step 450, the first video is wirelessly received from the leader drone. The computer 130 may wirelessly receive the first video from the drone₁ 120 via a local network or a direct connection like a Bluetooth connection, or the computer 130 may wirelessly receive the first video from the drone₁ 120 via a cellular network or a cloud network.

At step 460, the second video is wirelessly received from the first follower drone. The computer 130 may wirelessly receive the second video from the drone₂ 120 via the local network or the direct connection, or the computer 130 may wirelessly receive the second video via the cellular network or the cloud network.

At step 470, the first video and the second video are stitched together to obtain a master video. The computer 130 may stitch together the first video and the second video using the MMM capture component 235, which may comprise any suitable markerless motion capture software such as the SwRI's markerless motion capture software, including ENABLE. The first video and the second video may be stitched together based on the first timestamps, the first positional data, the second timestamps, and the second positional data.

At step 480, motion capture is performed on the master video to obtain motion data of the object. The computer 130 may obtain the motion data using the MMM capture component 235 and, specifically, the markerless motion capture software. The object may be an animal or a human, and the motion data may be of at least one joint of the animal or the human. The motion capture is performed independent of, or in the absence of, markers on the object.

While the method 400 describes a leader drone and a first follower drone, the method 400 may implement additional drones. For instance, at least one second follower drone in the drone swarm is instructed to move to at least one third position, at least one third camera of the at least one second follower drone is instructed to record at least one third video of the object, and stitching together the first video and the second video comprises stitching together the first video, the second video, and the at least one third video to obtain the master video. The first position, the second position, and the at least one third position may provide a 360-degree view of the object by the drone swarm to avoid occlusion of the object by itself or by other objects. Alternatively, the leader drone does not lead, the first follower drone does not follow, and the at least one second follower drone does not follow, but they instead all independently move to positions relative to the object.

Before performing the method 400, the MMM capture component 235 may be calibrated based on environmental conditions such as wind and rain. The calibration may occur in an environmental facility that allows for testing, validation, and product hardening to account for all environmental conditions and thus ensure data quality.

The motion data may be used to model motion of joints or other points of interest of the object, then to adjust parameters to obtain a desired result. In one example, an athlete moves a dominant leg differently from a non-dominant leg. The motion data reveal that difference, the MMM capture component 235 recommends a physical alteration to reduce or eliminate that difference, and the athlete applies the physical alteration to his or her movement. In another example, the motion data reveal the impact of a solider carrying a rucksack while the solider performs various duties, the MMM capture component 235 recommends an alteration to the rucksack, and the rucksack is altered accordingly. The motion capture and application of an alteration may be performed in an iterative manner to achieve a result within a desired range.

Alternatively, the system 300 may implement the method 400. Specifically, the computer 330 may implement the method 400. In that case, step 420 may be omitted because the first follower drone automatically moves to the second position by virtue of its connection to the support frame 340, or the drones 320 wiredly or wirelessly communicate with each other to synchronize and move in a dependent manner. At step 430, the first camera is not of the leader drone, but is instead attached to the support frame 340. Likewise, at step 440, the second camera is not of the first follower drone, but is instead attached to the support frame 340.

The term "about" means a range including ±10% of the subsequent number unless otherwise stated. Where single components, apparatuses, or systems are described as performing functions, multiple such components, apparatuses, or systems may implement the functions.

While several embodiments have been provided, the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Likewise, where single components, apparatuses, or systems are described as performing functions, multiple such components, apparatuses, or systems may implement the functions.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:

instructing, by wirelessly transmitting a first instruction, a leader drone in a drone swarm to move to a first position;

instructing, by wirelessly transmitting a second instruction, a first follower drone in the drone swarm to move to a second position;

instructing, by wirelessly transmitting a third instruction, a first camera of the leader drone to record, while the leader drone is in the first position, a first video of an object;

instructing, by wirelessly transmitting a fourth instruction, a second camera of the first follower drone to record, while the first follower drone is in the second position, a second video of the object;

instructing the leader drone and the first follower drone to synchronize with each other while the first camera records the first video and the second camera records the second video;

wirelessly receiving the first video from the leader drone;

wirelessly receiving the second video from the first follower drone;

stitching together, using one more processors, the first video and the second video to obtain a master video; and performing, using the one more processors, motion capture on the master video to obtain motion data of the object.

2. The method of claim 1, wherein the first position is relative to the object, and wherein the second position is relative to the leader drone.

3. The method of claim 1, wherein the second position is relative to the leader drone based on a distance of the first follower drone from the leader drone or based on an angle between the first follower drone and the leader drone.

4. The method of claim 1, further comprising:

instructing the leader drone to maintain the first position while the object moves and for a duration of the first video and the second video; and instructing the first follower drone to maintain the second position while the object moves and for the duration.

5. The method of claim 1, further comprising:

instructing the leader drone to move from the first position while the object moves and based on a change of a surface the object is on, environmental conditions, or a first video quality of the first video; and instructing the first follower drone to move from the second position while the object moves and based on the change, the environmental conditions, or a second video quality of the second video.

6. The method of claim 1, wherein the object is an animal or a human, and wherein the motion data are of at least one joint of the animal or the human.

7. The method of claim 1, further comprising:

further instructing the first camera to record the first video beginning at a first moment; and further instructing the second camera to record the second video beginning at the first moment.

8. The method of claim 7, further comprising instructing the first camera and the second camera to synchronize with each other before the first moment.

9. The method of claim 1, further comprising:

instructing at least one second follower drone in the drone swarm to move to at least one third position; and instructing at least one third camera of the at least one second follower drone to record at least one third video of the object, wherein stitching together the first video and the second video comprises stitching together the first video, the second video, and the at least one third video to obtain the master video.

10. The method of claim 9, wherein the first position, the second position, and the at least one third position provide a 360-degree view of the object by the drone swarm.

11. The method of claim 1, further comprising further stitching together the first video and the second video based on first timestamps in the first video and second timestamps in the second video.

12. The method of claim 1, further comprising further performing the motion capture independent of markers on the object.

13. An apparatus comprising:

one or more memories configured to store instructions; and one or more processors coupled to the one or more memories and configured to execute the instructions to cause the apparatus to:

instruct a leader drone in a drone swarm to move to a first position;

instruct a first follower drone in the drone swarm to move to a second position;

instruct a first camera of the leader drone to record, while the leader drone is in the first position, a first video of an object;

instruct a second camera of the first follower drone to record, while the first follower drone is in the second position, a second video of the object;

wirelessly receive the first video from the leader drone;

wirelessly receive the second video from the first follower drone;

stitch together the first video and the second video to obtain a master video;

perform motion capture on the master video to obtain motion data of the object;

instruct the leader drone to maintain the first position while the object moves and for a duration of the first video and the second video; and instruct the first follower drone to maintain the second position while the object moves and for the duration.

14. The apparatus of claim 13, wherein the first position is relative to the object, and wherein the second position is relative to the leader drone.

15. The apparatus of claim 13, wherein the one or more processors are further configured to further execute the instructions to cause the apparatus to:

instruct at least one second follower drone in the drone swarm to move to at least one third position;

instruct at least one third camera of the at least one second follower drone to record at least one third video of the object; and further stitch together the first video and the second video by stitching together the first video, the second video, and the at least one third video to obtain the master video.

16. The apparatus of claim 15, wherein the first position, the second position, and the at least one third position provide a 360-degree view of the object by the drone swarm.

17. A computer program product comprising instructions that are stored on a computer-readable medium and that, when executed by one or more processors, cause an apparatus to:

instruct a leader drone in a drone swarm to move to a first position;

instruct a first follower drone in the drone swarm to move to a second position;

instruct at least one second follower drone in the drone swarm to move to at least one third position, wherein the first position, the second position, and the at least one third position provide a 360-degree view of an object by the drone swarm;

instruct a first camera of the leader drone to record, while the leader drone is in the first position, a first video of the object;

instruct a second camera of the first follower drone to record, while the first follower drone is in the second position, a second video of the object;

instruct at least one third camera of the at least one second follower drone to record at least one third video of the object;

wirelessly receive the first video from the leader drone;

wirelessly receive the second video from the first follower drone;

stitch together the first video, the second video, and the at least one third video to obtain a master video; and perform motion capture on the master video to obtain motion data of the object.

18. The computer program product of claim 17, wherein the instructions, when executed by the one or more processors, further cause the apparatus to:

further instruct the leader drone by wirelessly transmitting a first instruction;

further instruct the first follower drone by wirelessly transmitting a second instruction;

further instruct the first camera by wirelessly transmitting a third instruction;

further instruct the second camera by wirelessly transmitting a fourth instruction;

further stitch together the first video and the second video using the one more processors; and further perform the motion capture using the one more processors.

19. The computer program product of claim 17, wherein the instructions, when executed by the one or more processors, further cause the apparatus to:

instruct the leader drone to maintain the first position while the object moves and for a duration of the first video and the second video; and instruct the first follower drone to maintain the second position while the object moves and for the duration.

20. The apparatus of claim 13, wherein the one or more processors are further configured to further execute the instructions to cause the apparatus to instruct the leader drone and the first follower drone to synchronize with each other while the first camera records the first video and the second camera records the second video.

* * * * *